March 24, 1970   R. S. MORROW   3,501,965
ELECTRONIC VIBRATION ANALYZING APPARATUS INCORPORATING
AUTOMATIC PHASE AND AMPLITUDE RECORDING MEANS
Filed June 30, 1966   3 Sheets-Sheet 3
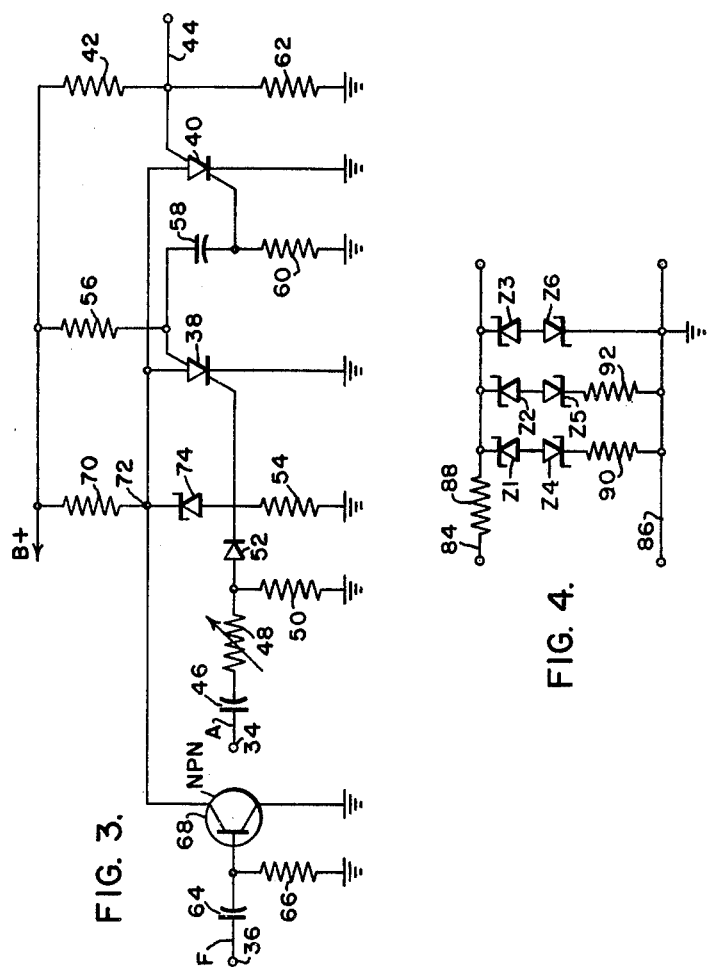
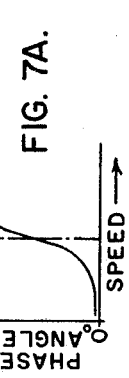
FIG. 7A.
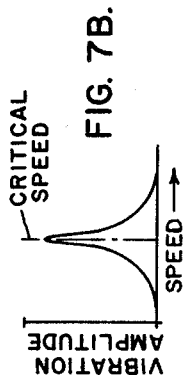
FIG. 7B.
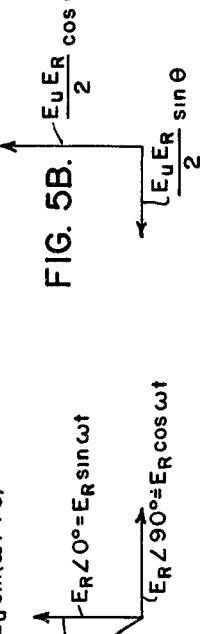
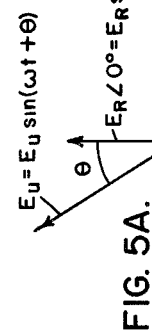
INVENTOR
Robert S. Morrow
BY
T. H. Murray
ATTORNEY

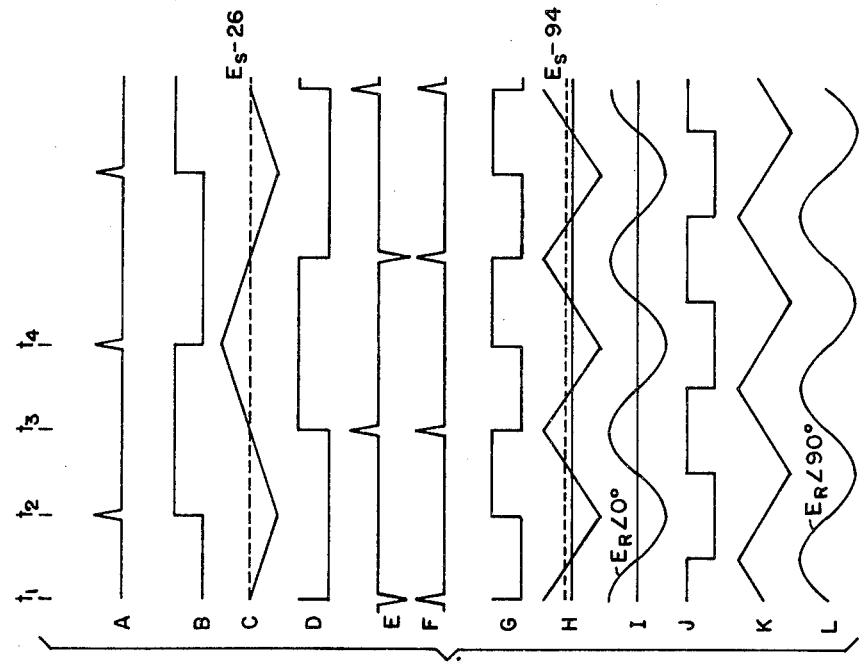
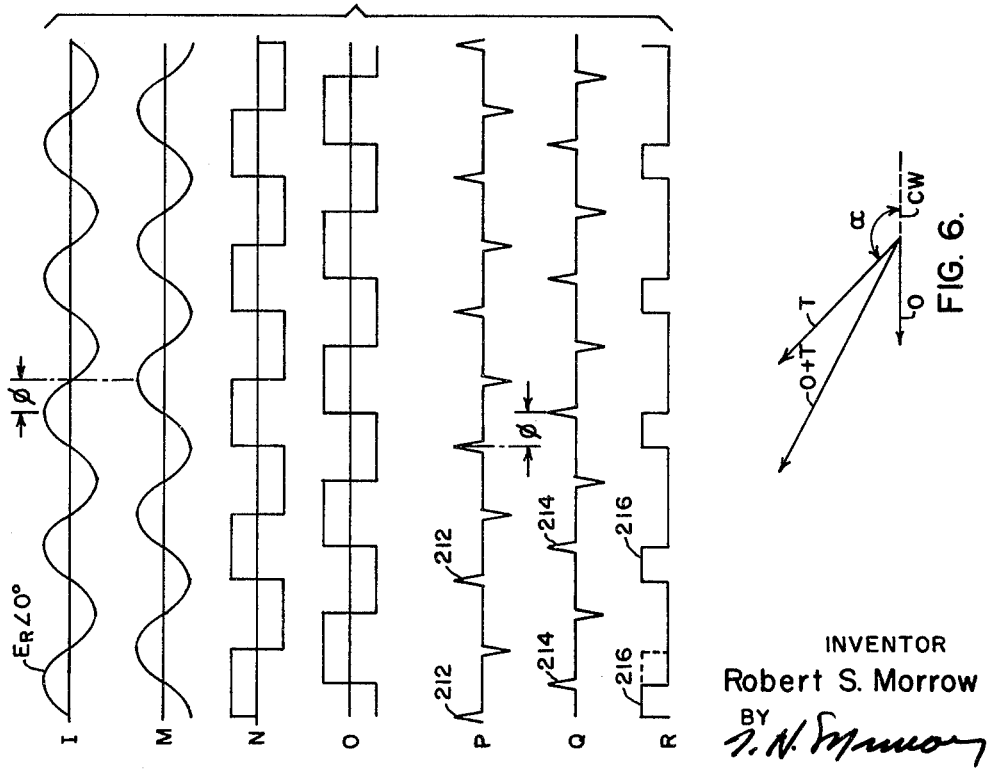

United States Patent Office 3,501,965
Patented Mar. 24, 1970

3,501,965
ELECTRONIC VIBRATION ANALYZING APPARATUS INCORPORATING AUTOMATIC PHASE AND AMPLITUDE RECORDING MEANS
Robert S. Morrow, Columbus, Ohio, assignor to International Research and Development Corporation, Worthington, Ohio, a corporation of Ohio
Filed June 30, 1966, Ser. No. 561,922
Int. Cl. G01m 1/16
U.S. Cl. 73—462
11 Claims

ABSTRACT OF THE DISCLOSURE

Described is apparatus, usable with electronic vibration analyzing equipment for rotating bodies and the like, which automatically plots speed versus phase lag angle and vibration amplitude for a particular rotating body to provide a permanent record which will indicate those speeds which should be avoided during operation of a particular piece of equipment or during a balancing operation.

---

Figure 1:
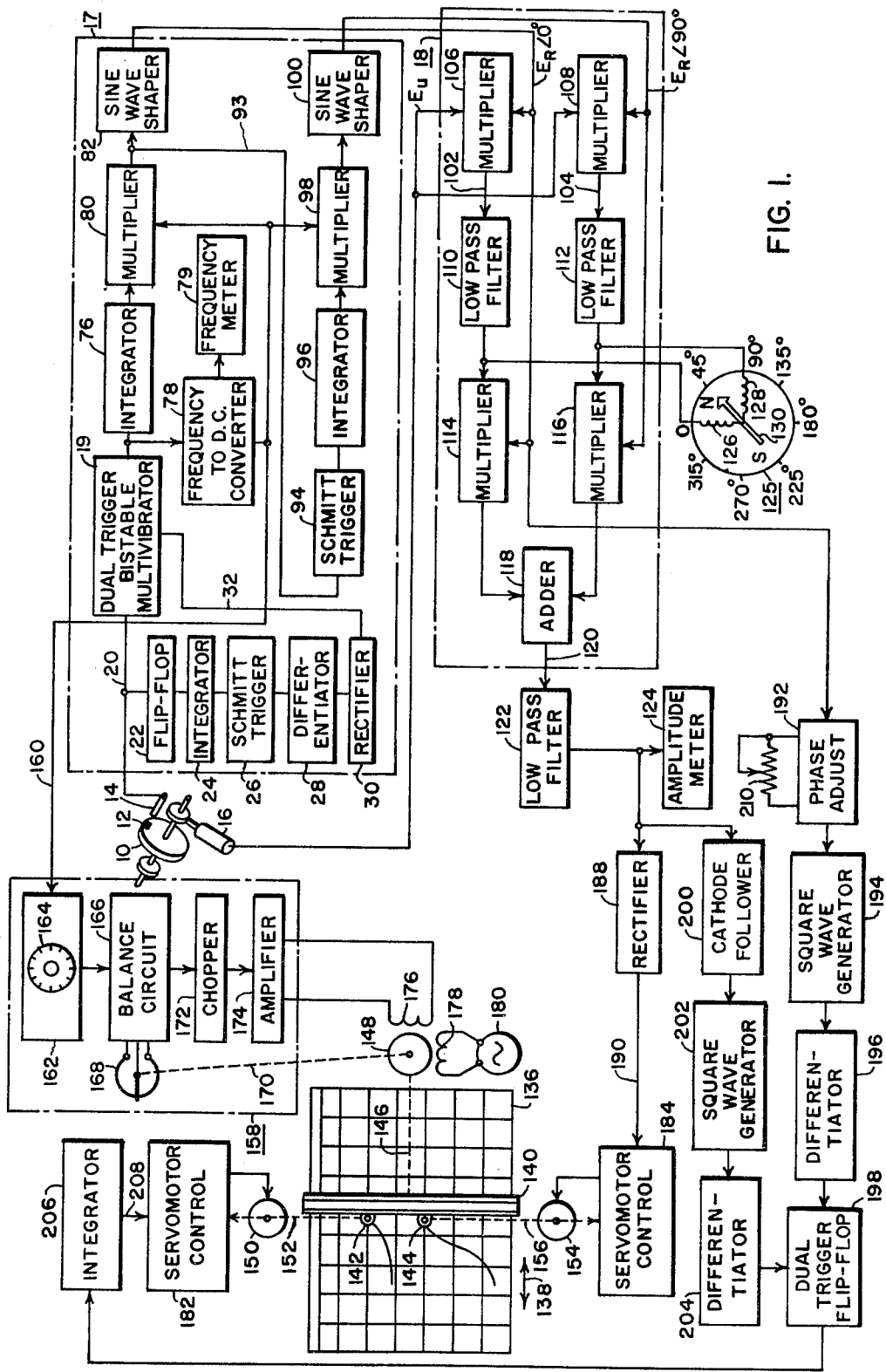

This invention relates to apparatus for balancing rotating bodies and the like, and more particularly to apparatus of the type described incorporating means for automatically recording the amplitude of vibrations and the phase lag angle of the vibrations over a range of speeds of a rotating body.

As is known, an unbalanced rotating body has a "heavy spot" at one point around its circumference which causes vibrational forces when the body rotates. This "heavy spot" or unbalance may be due to eccentricity or other factors. In order to sense mechanical vibrations, conventional vibration analyzing apparatus utilizes an electromagnetic transducer, in contact with a bearing housing or the like for the rotating body, which transforms the vibrational forces into an electrical displacement signal. This displacement signal, substantially sinusoidal in form, has a frequency equal to that of the vibrations, an amplitude proportional to the magnitude of the vibrations, and a phase displacement relative to a reference signal which is related to the location of the point of unbalance or "heavy spot" on a rotating body.

Contrary to what might be expected, there is a definite phase lag between the instantaneous position of the "heavy spot" on the rotating body and the vibrational force which results as sensed by the aforesaid electromagnetic transducer. Thus, if one were to plot along a sine wave the physical position of the "heavy spot" as the member rotates and compare it with the vibrational force as sensed by the transducer, he would find a phase lag between the two. Furthermore, the magnitude of the phase angle changes with a change in speed of the rotating body. If the phase angle is plotted against rotating speed, it is found that while the phase angle is constant for any one particular speed, it varies from a small angle at low rotating speeds to nearly 180° at higher speeds. As the speed of an unbalanced body is increased from a low value to a higher value, it will pass through a resonant frequency or speed. Below this resonant frequency, the phase lag angle remains more or less constant; while above the resonant frequency, the phase lag angle is again constant but displaced substantially 180° with respect to the angle at lower speeds. At and around the resonant frequency which is between the aforesaid lower and upper speeds, the phase angle changes extremely rapidly; and, at the same time, the magnitude or amplitude of the vibrations increases abruptly.

Thus, when the speed of a rotating body is at or near its critical resonant speed, a very small change in speed can change the phase lag angle appreciably. Since a balancing operation utilizing vibration analyzing apparatus must assume that the phase lag angle remains constant throughout the balancing procedure, an attempt should not be made to balance at or near a critical resonant speed. Possibly more important, however, is the fact that all rotating bodies will have a certain amount of unbalance, and the body should not be rotated or operated at a speed near its critical speed.

It, therefore, becomes highly desirable to provide a plot of speed versus phase lag angle and vibration amplitude for a particular rotating body to provide a permanent record which will indicate those speeds which should be avoided during operation of a particular piece of equipment or during a balancing operation. While this can be accomplished manually by taking readings from amplitude, phase and frequency meters at different speeds, it is a tedious and time-consuming process, particularly where a large number of bodies are to be balanced.

Accordingly, the objects of the invention include:
To provide vibration analyzing apparatus incorporating means for automatically plotting speed versus phase lag angle of a vibrational signal;
To provide vibration analyzing apparatus incorporating means for automatically plotting the speed of a rotating body versus the amplitude of a vibrational signal obtained from that body; and
To provide means in vibration analyzing apparatus for automatically and simultaneously plotting vibration amplitude and phase lag angle versus speed.

The above and other objects and features of this invention will become apparent from the following detailed description taken in connection with the accompanying drawings which form a part of this specification, and in which:
FIGURE 1 is a block diagram of the overall system of the invention incorporating the means for automatically plotting speed versus phase lag angle and vibrational amplitude;
FIG. 2 comprises waveforms illustrating the operation of the sine wave generating circuitry shown in FIG. 1;
FIG. 3 is a detailed schematic circuit digram of the dual trigger bistable multivibrator utilized in the system of FIG. 1;
FIG. 4 is a detailed schematic circuit diagram of the sine wave shaper of FIG. 1;
FIGS. 5A, 5B and 5C are vector diagrams illustrating the operation of the synchronous filter of the vibration analyzing apparatus;
FIG. 6 is a vector diagram illustrating a balancing operation in accordance with the teachings of the invention;
FIGS. 7A and 7B are plots illustrating the variation in phase lag angle and vibration amplitude as a function of the speed of a rotating body; and
FIG. 8 comprises waveforms illustrating the operation of the automatic phase and amplitude recording equipment of the invention.

With reference now to the drawings, and particularly to FIG. 1, a rotating member 10 is shown which, in the example given, is light-colored and has a dark spot 12 at one point around its periphery such that a photocell 14 will be actuated once during each rotation of the member 10 at precisely the same point. Alternatively, the spot 12 could be replaced by a member which affects a magnetic field, such as a slot or a rib in a magnetically permeable body; and the photocell 14 replaced by a magnetic pickup, with the same overall effect. The vibrations caused by the rotating member 10 are sensed by an electromagnetic transducer or vibration pickup 16 which produces an alternating current signal as member 10 rotates, this signal having a frequency equal to the rotational speed of the member 10 and an amplitude or displacement proportional to the magnitude of vibrations induced in member 10. Suitable transducers for this purpose are described, for example, in U.S. Patent Nos. 2,754,435 and 3,157,852.

The circuitry of the vibration analyzing apparatus includes two elements enclosed by broken lines and identified generally by the numerals 17 and 18, respectively. The element 18 comprises the synchronous filter of the invention which requires for its operation two sine wave signals 90° out of phase with respect to each other and having a frequency equal to the rotational speed of the body 10 being balanced. While such signals can be obtained from a tachometer mechanically connected to the rotating body 10 and a phase shift circuit, it is sometimes inconvenient or impossible to make such a mechanical connection. Accordingly, the sine wave generator 17 is employed which converts the pulses from photocell 14 into the required two sine wave signals displaced 90° with respect to each other.

With reference to the sine wave generator 17, it is described in detail in U.S. Patent No. 3,340,476, issued Sept. 5, 1967 and assigned to the assignee of the present application. The pulses from photocell 14, illustrated as waveform A in FIG. 2, are applied to one input terminal of a dual trigger bistable multivibrator 19 through conductor 20. The pulses on conductor 20 are also applied to a flip-flop circuit 22, the output of the flip-flop circuit 22 appearing as waveform B in FIG. 2. By integrating the waveform B in integrator 24, waveform C of FIG. 2 is produced. This waveform is applied to a Schmitt trigger circuit 26. As is known, a Schmitt trigger circuit is a type of multivibrator which will shift from one stable state to the other whenever the magnitude of an input signal rises above a predetermined amplitude. The circuit will remain in its other stable state until the magnitude of the input signal falls below the aforesaid predetermined amplitude. Therefore, by causing the circuit 26 to fire at the voltage level $E_s$–26 shown on waveform C, the waveform D will be produced. This latter waveform, it will be noted, is displaced 180° with respect to waveform B.

The resulting waveform D from circuit 26 is then applied to a differentiator 28 which produces waveform E of FIG. 2 comprising a series of spiked pulses, a positive pulse appearing at the leading edge of each square-wave pulse in waveform D and a negative pulse appearing at the trailing edge. By passing waveform E through a rectifier 30, the negative pulses are inverted, producing waveform F wherein the spiked pulses are intermediate those in waveform A. That is, assuming that the pulses in waveform A occur when the mark 12 on member 10 is at the top high noon position, pulses in waveform B will occur when the mark 12 is displaced 180° with respect to its top high noon position.

The dual trigger bistable multivibrator 19 is shown in detail in FIG. 3 and includes a first input terminal 34 to which the pulses in waveform A are applied, and a second input terminal 36 to which the pulses in waveform F are applied. The multivibrator proper includes two silicon controlled switches 38 and 40 connected such that when one switch 38 or 40 conducts the other is cutoff, and vice versa.

At time $t_1$ shown in FIG. 2, the switch 40 will conduct, whereby current from the B+ voltage source will flow through resistor 42 to drive the output terminal 44 less positive. This appears in waveform G of FIG. 2 following the time $t_1$. This condition will exist with the switch 40 conducting until time $t_2$ is reached in FIG. 2. At this time, a pulse in waveform A is applied through capacitor 46 and variable resistor 48 across resistor 50. The pulse is also applied through diode 52 across resistor 54; and the resulting voltage across resistor 54 applies a positive bias to the gate electrode of the silicon controlled switch 38, whereupon the switch 38 conducts. As the switch 38 conducts, current is drawn through resistor 56, thereby lowering the anode potential on switch 38. This reduction in potential is instantaneously applied through capacitor 58 and bias resistor 60 to the gate of switch 40, thereby causing this latter switch to cutoff. As switch 40 cuts off, its anode potential rises such that the output waveform G in FIG. 2 rises in potential as seen following the time $t_2$. The foregoing switching action occurs with extreme rapidity and, hence, the potential in waveform G rises abruptly, creating a square-wave configuration.

The voltage at output terminal 44 will remain at its higher value with current flowing through resistors 42 and 62 until a phase in waveform F is again received on terminal 36 at time $t_3$ in FIG. 2. This pulse is applied through coupling capacitor 64 across resistor 66, thereby causing NPN transistor 68 to conduct. When transistor 68 conducts, current is drawn through resistor 70, thereby lowering the potential at point 72. This potential, applied to the anodes of switches 38 and 40, causes switch 38 to cut off and switch 40 to conduct, whereupon the voltage of waveform G in FIG. 2 falls abruptly as seen following the time $t_3$.

At time $t_4$, another pulse in waveform A is received on terminal 34, whereupon the process is repeated; and it will be appreciated that a square-wave signal (waveform G) is derived in which the cycle of the square wave is repeated once during each rotation of the member 10, e.g., from the time $t_2$ to the time $t_4$. The Zener diode 74 in the circuit of FIG. 3 is utilized for the purpose of establishing a voltage level at which the switching action will occur.

With reference, again, to FIG. 1, the output of the dual trigger bistable multivibrator 19 comprising waveform G in FIG. 2 is applied to an integrator 76 which integrates the square waveform G to produce an integrated triangular waveform illustrated as waveform H in FIG. 2. However, the amplitude of the output waveform H from integrator 76 is frequency-sensitive. That is, if we consider that the fundamental of the square wave G is $E_1 \sin wt$, then the integral of this fundamental will be $$\frac{E_1}{w} \cos wt.$$

Therefore, in order to eliminate the frequency factor $w$, a frequency-to-direct-current converter 78 is connected to the output of the dual trigger bistable multivibrator 19, the output of this circuit 78 being represented by the factor $Kw$ where K is a constant determined by the parameters of the circuit 78. By multiplying the factor $Kw$ by $$\frac{E_1}{w} \cos wt$$

in multiplier 80, the output of the multiplier will be $KE_1 \cos wt$, the amplitude of which is clearly not frequency-sensitive. It will be understood, of course, that the harmonics included in the square-wave signal (waveform G) are multiplied in the same manner to eliminate amplitude variations.

Connected to the frequency-to-direct-current converter 78 is a frequency meter 79 which indicates the frequency of the pulses produced by the photocell 14. The frequency of the pulses produced by photocell 14, in turn, is equal to the frequency of one of the vibration signals sensed by the vibration pickup 16. Hence, the meter 79 serves to indicate the frequency of the rotation.

From multiplier 80, the triangular waveform H of FIG. 2 is applied directly to a sine wave shaper 82. Although various types of sine wave shapers may be employed herein, one suitable type is shown in FIG. 4. It includes a pair of input terminals 84 and 86, the terminal 86 being grounded. Terminal 84 is connected through resistor 88 to the cathodes of a first set of Zener diodes Z1, Z2 and Z3. The anodes of Zener diodes Z1, Z2 and Z3 are, respectively, connected to the anodes of a second set of three Zener diodes Z4, Z5 and Z6 The cathode of Zener diode Z6 is connected directly to ground, whereas the cathodes of Zener diodes Z4 and Z5 are connected to ground through resistors 90 and 92, respectively, the resistor 90 is larger than resistor 92.

Let us assume, for example, that the peak-to-peak voltage of the triangular waveform H in FIG. 2 is 15 volts. Furthermore, it will be assumed that the breakdown voltages of diodes Z1 and Z4 are 3.9 volts; the breakdown voltages of diodes Z2 and Z5 are 4.7 volts and the breakdown voltages of diodes Z3 and Z6 are 5.1 volts. As the positive half cycle of the triangular waveform H of FIG. 2 increases in a positive direction from the zero axis, the diode Z1 will conduct first, followed by conduction of diode Z2 and finally by conduction of diode Z3. As the voltage of waveform H then falls on the positive side of the zero axis, diode Z3 will first cut off, followed by cutting off of diode Z2 and finally cutting off of diode Z1. In this process, the triangular waveform H is rounded off to produce a positive half cycle of the sine wave I as shown in FIG. 2. Similarly, as the triangular waveform H increases in a negative direction below the zero axis, diode Z4 will conduct first, followed by conduction of diode Z5 and finally conduction of diode Z6. As the triangular waveform H rises in a positive direction, but on the negative side of the zero axis, diode Z6 will cut off first, followed by cutting off of diode Z5 and finally cutting off of diode Z4. In this process, the negative half cycle of waveform I is produced. The output of circuit 82 is, therefore, the sine wave I of FIG. 2. This signal is identified as $E_R \angle 0°$ in FIG. 1.

In order to produce a second sine wave which is shifted in phase with respect to sine wave I by 90°, the triangular waveform H at the output of multiplier 80 is first applied through a conductor 93 to a Schmitt trigger circuit 94 which functions in the same manner as the Schmitt trigger circuit 26 previously described. It will be assumed that the predetermined voltage level at which the Schmitt trigger 94 fires is $E_s$—94 illustrated on waveform H in FIG. 2. Consequently, the Schmitt trigger circuit 94 will fire to produce an output pulse whenever the input signal rises above the voltage level $E_s$—94. The result is waveform J in FIG. 2 comprising a square waveform shifted in phase with respect to waveform G by 90°. The waveform J is then integrated in intergrator 96 and multiplied in multiplier 98 with the output of the frequency-to-direct-current converter 78. In this respect, compensation for changes in amplitude due to changes in frequency is accomplished in the same manner as it is in multiplier 80. The resulting triangular waveform K in FIG. 2 is then applied to a second sine wave shaper 100 identical to the sine wave shaper 82 previously described. The result is sine wave L in FIG. 2 which is shifted in phase with respect to sine wave I and is identified as $E_R \angle 90°$ in FIG. 1.

The signals $E_R \angle 0°$ and $E_R \angle 90°$ are applied to the band-pass filter apparatus 18 in combination with the vibration signal $E_U$. The filter apparatus 18 is the subject of U.S. Patent No. 3,307,408, issued Mar. 7, 1967 and assigned to the assignee of the present application. As shown, it includes a pair of signal channels 102 and 104 each of which includes a first multiplier circuit 106 and 108, respectively. Applied to multiplier circuit 106 is the signal $E_R \angle 0°$ which may be represented mathematically by:

$$E_R \sin wt$$

Similarly, applied to multiplier circuit 108 is the signal $E_R \angle 90°$ which is shifted in phase with respect to $E_R \angle 0°$ by 90° and which may be represented by:

$$E_R \cos wt$$

The signals $E_R \angle 0°$ and $E_R \angle 90°$ are multiplied in circuits 106 and 108 respectively by the vibration input signal $E_U$. If this signal is of the same frequency, $w$, as $E_R \angle 0°$ and $E_R \angle 90°$ it may be represented by:

$$E_U \sin (wt+\theta)$$

where $\theta$ is the difference in phase between the input signal $E_U$ and $E_R \angle 0°$. As will be appreciated, the signal $E_U$ will contain components of the same frequency, $w$, as $E_R \angle 0°$ and $E_R \angle 90°$ since it is due to the vibration occurring as a result of the rotating member 10 from which the pulses applied to circuit 17 are derived. The signals induced in the pickup 16 due to other vibrating parts, however, will have different frequencies than the frequency, $w$, identified above.

As will be seen, the filter 18 is designed to pass signals having the frequency $w$. Therefore, an input signal represented by the formula:

$$E_U \sin (wt+\theta)$$

derived as a result of vibrations from member 10 will pass through the filter. However, a signal of another frequency, $w_1$, will not pass through the filter. This latter signal can be represented by the formula:

$$E_U \sin (w_1 t)$$

The outputs of multiplier circuits 106 and 108 are fed through low-pass filters 110 and 112, respectively, which eliminate alternating current components, leaving only direct current components which are applied to a second pair of multiplier circuits 114 and 116. In circuits 114 and 116, the direct current outputs of circuits 110 and 112 are multiplied with $E_R \angle 0°$ and $E_R \angle 90°$, respectively, thereby producing alternating current signals which are combined in adder 118 to produce an output on lead 120 when, and only when, the input signal $E_U$ is of the same frequency, $w$, as $E_R \angle 0°$ and $E_R \angle 90°$. In other words, the filter circuit 18 will eliminate all signals other than those due to vibrations of the member 10 from which the pulses applied to circuit 17 were derived. This means, in effect, that if vibration signals are picked up by element 16 due to vibrating parts other than those caused by the rotating member 10, they will not pass through the filter 18.

Operation of the filter 18 may best be understood by reference to FIGS. 5A, 5B and 5C. In FIG. 5A, vectors representing $E_R \angle 0°$, $E_R \angle 90°$ and $E_U$ are shown with $E_U$ being equal in frequency to $E_R \angle 0°$ and $E_R \angle 90°$. Thus, $E_R \angle 0°$ and $E_R \angle 90°$ are 90° out of phase with respect to each other, while $E_U$ is shifted in phase with respect to $E_R \angle 0°$ by the angle $\theta$. Multiplication of $E_U$ by $E_R \angle 0°$ in circuit 106 may be represented mathematically as follows:

$$E_R \sin wt \times E_U \sin (wt+\theta) = \frac{E_R E_U}{2}[\cos \theta - \cos (2wt+\theta)]$$

Similarly, multiplication of $E_U$ by $E_R \angle 90°$ in circuit 108 may be represented as:

$$E_R \cos wt \times E_U \sin (wt+\theta) = \frac{E_R E_U}{2}[\sin \theta + \sin (2wt+\theta)]$$

The voltages, $$\frac{E_R E_U}{2}[\cos \theta - \cos (2wt+\theta)]$$

and $$\frac{E_R E_U}{2}[\sin] \theta + \sin (2wt+\theta)]$$

appear at the outputs of multipliers 106 and 108, respectively. After passing through filters 110 and 112, the alternating current components are eliminated, leaving only the direct current components:

$$\frac{E_R E_U}{2} \cos \theta$$

and $$\frac{E_R E_U}{2} \sin \theta$$

respectively at the outputs of filters 110 and 112 in FIG. 1. These direct current voltages are vectorially represented in FIG. 5B.

The direct current components are then multiplied by $E_R \angle 0°$ and $E_R \angle 90°$, respectively, in circuits 114 and 116 to produce a signal represented by:

$$KE_U E_R \cos \theta \; (E_U \sin wt)$$

at the output of circuit 114, and $$KE_U E_R \sin \theta \; (E_R \cos wt)$$

at the output of circuit 116. K is a multiplication constant associated with the circuitry and can be neglected for purposes of explanation. Perfect sine wives now appear at the outputs of multipliers 114 and 116 in the circuit of FIG. 1. These two signals are shown in FIG. 5C having the same phase separation as $E_R \angle 0°$ and $E_R \angle 90°$ and an amplitude proportional to the unknown input signal $E_U$. Therefore, addition of the voltages in adder 118 produces an output which is mathematically represented by:

$$K_1 E_U \sin (wt+\theta)$$

This signal is of the same frequency as $E_R \angle 0°$ and $E_R \angle 90°$, has the same phase as $E_U$ at the input, and occurs only when the frequency of $E_U$ at the input is equal to the frequency of $E_R \angle 0°$ and $E_R \angle 90°$. It should be noted that no phase shift whatever has occurred in the signal in passing through the filter. Furthermore, the tuned or center frequency of the filter automatically coincides with the instantaneous frequency of $E_R \angle 0°$ and $E_R \angle 90°$.

Now, if it is assumed that the frequency of $E_U$ is not the same as that of $E_R \angle 0°$ and $E_R \angle 90°$, than $E_U$ may, for example, be represented as:

$$E_U = E_U \sin w_1 t$$

where $w_1$ is a frequency different from the frequency, $w$, of signals $E_R \angle 0°$ and $E_R \angle 90°$. Then, multiplication in circuit 106, for example, will produce:

$$E_U \sin w_1 t \times E_R \sin wt = E_U E_R \sin w_1 t \sin wt =$$
$$\frac{E_U E_R}{2}[\cos (w_1 - w)t - \cos (w_1 + w)t]$$

A similar multiplication occurs in circuit 108, and it can be seen that the product contains no direct current component. Consequently, at all other frequencies other than the frequency, $w$, the filters 110 and 112 will reject everything, and no output appears.

The output signal comprising $E_U$ may then be applied through a manually adjustable band-pass filter 122 to an amplitude meter 124. The filter 122 may be employed, if desired, to employ finer filtering of the vibration signal $E_U$.

Thus, the frequency of the vibration signal is indicated by frequency meter 79, and its amplitude indicated by amplitude meter 124. In order to determine the phase of the vibration signal, a phase meter 125 is provided. The phase meter 125 comprises a pair of coils 126 and 128 connected in series and having their axes lying in the same plane at 90° with respect to each other. The ends of the series-connected coils 126 and 128 are connected to the outputs of filters 110 and 112, respectively, such that the direct current signals:

$$\frac{E_U E_R}{2} \cos \theta$$

and $$\frac{E_U E_R}{2} \sin \theta$$

are applied to the coils 126 and 128, respectively, in series opposition. This will produce a combined magnetic field, the orientation of which is dependent upon the relative strengths of the two direct current voltages. By providing a pointer 130 at the junction of the two coils 126 and 128 and permitting the pointer to rotate through a complete 360° arc about an axis extending perpendicular to the axes of the coils 126 and 128 and in a plane parallel to the plane of the coil axes, the pointer 130 will assume an orientation determined by the relative strengths of the two direct current voltages. This assumes, of course, that the pointer 130 is permanently magnetized as indicated. The angular orientation of the pointer 130, therefore, will correspondening to the phase of $E_U$, the unbalance signal.

In a balancing operation, the vibration pickup 16 and photocell 14 are operatively associated with the rotating member 10 as shown in FIG. 1. It is a characteristic of rotating bodies that they pass through resonant speeds of rotation at which the vibration signal is erratic. This can be sensed in accordance with the present invention by observing the pointer 130 on the phase meter 125. When the rotating member is at a resonant frequency, the pointer 130 will sweep back and forth somewhat erratically. Between the resonant frequencies, however, the pointer 130 will assume a fixed position. Therefore, by increasing the speed of the member 10 from a low value to a higher value, the periods of resonance can be plotted. This is a distinct advantage of the present invention over prior-art vibration analyzing devices wherein there was no convenient means of determining whether a balancing operation was being attempted at a resonant frequency where erratic results would be obtained.

In order to effect a balancing operation, a speed is selected at which the pointer 130 assumes a fixed position. Let us assume, for example, that the pointer is in a position indicating a phase angle of 270°. Furthermore, let us assume that the displacement indicated by meter 124 is 2.5 mils. Vectorially, this can be represented as shown in FIG. 6 by the vector identified as 0. If we now stop the rotating member 10 and add a trial weight at any desired point around its periphery, and then cause the member 10 to rotate at the same speed as it was rotating before (as indicated by meter 79), the meter 125 may assume a phase angle of 300° and the displacement meter 124 may indicate 6 mils. This may be represented vectorially in FIG. 6 by the vector identified as 0+T.

Thus, the original unbalance (0) in the member 10 was represented by 2.5 mils and a phase angle of 270°. After adding a trial weight, the unbalance due to both the original plus the trial weight (0+T) is represented by 6 mils at a phase of 300°. In FIG. 6, the length of the vectors are, of course, proportional to the amounts of unbalance, which means that the vector 0 is proportional to the 2.5 mils and the vector 0+T is proportional to 6 mils. Since the vector 0+T is the sum of the vectors due to the original unbalance and that due to the trial weight, by vector resolution we find that the trial weight T has a value of 4.04 mils at an angle of 318°. In order to balance the rotating body, a corrective weight CW must be added which is equal and opposite to the original unbalance 0. This is shown by the dotted vector (CW) in FIG. 6. Furthermore, it is known that the corrective weight may be displaced from the position of the trial weight previously placed on the rotating body by the angle $\alpha$. The magnitude of the corrective weight may be determined from the following relationship:

$$CW = \frac{O}{T} \times \text{trial weight}$$

In the example given above, therefore, the corrective weight will be:

$$CW = \frac{2.5}{4.04} \times \text{trial weight or } 0.62 \times \text{trial weight}$$

Assuming that the trial weight weighed 10 grams, then the corrective weight must weigh 6.2 grams and be displaced 132° with respect to the position of the trial weight. In the example given, the corrective weight will be displaced in a clockwise direction with respect to the trial weight by 132°. Therefore, by removing the trial weight and by placing a corrective weight of 6.2 grams on the body at a point removed 132° counterclockwise with respect to the position of the trial weight, the body should be balanced. This will be indicated by a very low reading on the displacement meter 124 in a subsequent "proving" determination.

As was mentioned above, if one were to plot along a sine wave the physical location of the "heavy spot" or point of unbalance as the member 10 rotates and compare it with the vibrational force sensed by the transducer 16, he would find a phase lag between the two; and this phase lag angle would change with change in speed of the rotating body. Similarly, the amplitude of the vibrational force varies as the speed of the rotating body is varied.

In FIGS. 7A and 7B, plots of phase lag angle and vibration amplitude versus speed are plotted. Note that the phase angle varies from about 0° at low speeds to 180° at higher speeds. At the lower speeds, the phase lag angle is relatively constant, and is also more or less constant at higher speeds. However, between these higher and lower speeds is an intermediate critical resonant speed about which the phase angle is changing very rapidly. Again, in FIG. 7B, it will be noted that the vibration amplitude is relatively constant at the lower and higher speed ranges; however intermediate these ranges and particularly at the critical resonant speed, the amplitude of the vibrations increases abruptly. Needless to say, the rotating body in question should not be operated at or near the critical speed, nor should a balancing operation be performed at or near the critical speed since the balancing operation as described above inherently assumes that the phase lag angle remains constant throughout the balancing procedure.

The apparatus with which the present invention is particularly concerned for automatically producing plots corresponding to those shown in FIGS. 7A and 7B is illustrated in FIG. 1. It includes a flat table 136 having graph paper on its upper surface. Reciprocable along the table 136 from left-to-right and vice versa (i.e., along the direction of arrow 138) is an elongated carriage 140 which is guided along tracks, not shown, at the upper and lower edges of the table. In this respect, the table 136 and carriage 140 are similar to a conventional drafting table. Carried on the carriage 140 and reciprocable at right angles to the direction of arrow 138 are a pair of pens 142 and 144. As will be seen, the pen 142 is used to scribe or draw the curve corresponding to that shown in FIG. 7A which is a plot of phase lag angle versus speed. Similarly, the pen 144 is utilized to draw the curve shown in FIG. 7B comprising a plot of amplitude versus speed of the vibrational signal sensed by transducer 16.

The carriage 140 is connected through a suitable mechanical linkage 146 to a servomotor 148. Similarly, pen 142 is connected to servomotor 150 through mechanical linkage 152; whereas pen 144 is connected to servomotor 154 through mechanical linkage 156.

The servomotors 148, 150 and 154 are all controlled by similar control circuits; and, accordingly, only the control circuit 158 for servomotor 148 will be described in detail. The input to the control circuit 158 on lead 160 is a direct current voltage which, in this case, comprises the output of the frequency-to-direct-current converter 78. Hence, the magnitude of the direct current voltage on lead 160 is proportional to the speed of rotation of the member 10. This direct current voltage is applied to a step attenuator 162 in circuit 158 which is set by means of a manually adjustable dial 164 to the proper range such that the amplitude of the input data will be within the travel limits of the carriage 140.

The direct current input signal on lead 160, after passing through the attenuator 162, is fed to a balance circuit 166 where it is balanced by an internally supplied opposing voltage derived from a reference cell, not shown, and a potentiometer 168. The movable tap on potentiometer 168 is connected through linkage 170, preferably a gear reducer or the like, to the servomotor 148. Hence, the position of the movable tap on potentiometer 168 is an indication of the physical position of the carriage 140 on the table 136.

The output of the balance circuit 166, in turn, is applied to a chopper 172, the output of the chopper 172 comprising an alternating current signal which is fed through amplifier 174 to one phase or winding 176 on the two-phase servomotor 148. The other winding or phase 178 of the servomotor 148 is connected to a source of alternating current voltage 180 as shown.

When the servomotor 148 is at rest and the carriage 140 is not moving, the direct current voltage on lead 160 will be balanced by the voltage supplied by potentiometer 168 and the aforesaid reference cell in the balance circuit 166. However, when the input direct current voltage on lead 160 changes to a new value as when the speed of the rotating member 10 varies, the input direct current voltage is no longer balanced in circuit 166 and the unbalanced voltage, or error signal, is applied to the chopper 172 where it is converted to a 60-cycle alternating current form. The 60-cycle output of the chopper 172, after amplification in amplifier 174, is applied to the winding 176 and, in effect, compared with the 60-cycle alternating current on winding 178 to cause the motor 148 to rotate and move the carriage 140. As the motor 148 moves, the tap on potentiometer 168 moves to again cancel out or balance the direct current voltage on lead 160.

It will be appreciated that the system just described comprises a conventional servo system. If the input data from the frequency-to-direct current converter 78 is constantly changing, the rebalancing operation of the servo system is continuous. Thus, the positions of the movable tap on potentiometer 168 and of the carriage 140 are always directly proportional to the amplitude of the direct current voltage on lead 160.

As was mentioned above, the operation of servomotors 150 and 154 is the same as that of servomotor 148. In this respect, servomotor 150 is connected to a servomotor control circuit 182 identical to circuit 158 just described. Similarly, servomotor 154 is connected to a servomotor control circuit 184 also identical to the control circuit 158.

Since the servomotor 148 is responsive to the output of the frequency-to-direct-current converter 78, the position of the carriage 140 will always be proportional to the speed of the rotating member 10. As the speed of member 10 increases, the servomotor 148 will cause the carriage 140 to move to the right; whereas, when the speed decreases, the carriage 140 will move to the left.

In order to plot the amplitude of the vibrations sensed by transducer 16 versus speed it is, of course, necessary to derive a direct current voltage which is proportional to vibration amplitude. This is accomplished in accordance with the present invention by applying the displacement signal $E_U$ at the output of filter 122 to rectifier 188. The resulting direct current voltage on lead 190 as applied to servomotor control circuit 184 is, therefore, always proportional to the amplitude of the vibrations sensed by transducer 16.

Let us assume, for example, that the speed of the member 10 is increased from a low speed near zero up to a higher speed. As the speed is increased, it will pass through the resonant or critical speed, whereupon the amplitude of the vibrations sensed by transducer 16 will increase as will the direct current output on lead 190. This causes the servomotor 154 to move the pen 144 upwardly as shown in FIG. 1 as the carriage 140 moves to the right. After the critical speed is passed, the servomotor 154 will reverse, thereby moving the pen 144 downwardly, whereupon the characteristic curve shown on the lower portion of table 136 in FIG. 1 will be produced, this curve corresponding to that shown in FIG. 7B.

In order to produce the curve of phase lag angle versus speed it is, of course, necessary to first determine the phase difference between the vibration or displacement signal $E_U$ as detected by transducer 16 and a reference signal. In the present case, the reference signal utilized is $E_R \angle 0°$ as applied to the multipliers 114 and 106. This reference signal, of course, does not necessarily coincide with the location of the "heavy spot" on the rotating member 10; however it does serve as a reference point from which a variation in phase can be determined.

Th signal $E_R \angle 0°$ is applied first to a phase adjustment circuit 192 and thence to a square-wave generator 194. The output of the square-wave generator 194, in turn, is applied to a differentiator 196 which produces spiked differentiated pulses of positive polarity at the leading edges of the square-wave output of circuit 194, and spiked negative pulses at the trailing edges of the square-wave output. The positive spiked pulses are used to trigger one side of dual trigger flip-flop circuit 198, as shown. The square-wave generator 194 preferably comprises a pair of cathode-coupled amplifiers in cascade; however any square-wave generator may be employed which will not materially shift the phase of the square wave as compared to the input sine wave signal.

The vibrational signal from low-pass filter 122 is applied through cathode follower 200 to a second square-wave generator 202. The output of the square-wave generator 202, in turn, is applied to a differentiator 204 which operates in the same manner as the differentiator 196 to produce positive spiked pulses at the leading edges of the square-wave output of circuit 202 and negative spiked pulses at the trailing edges. The positive spiked pulses, in turn, are utilized to trigger the other side of the dual trigger flip-flop circuit 198 such that the output of circuit 198 will comprise square-wave pulses, the widths of which are equal to the phase difference between the positive spiked output pulses from circuits 196 and 202. This phase difference, in turn, is proportional to the phase lag angle of the vibrational signal. The square-wave output of circuit 198, in turn, is integrated in integrator 206 to produce a direct current voltage on lead 208 which is applied to the servomotor control circuit 182.

The operation of the circuits just described is perhaps best shown in FIG. 8 wherein the reference signal $E_R \angle 0°$ is illustrated as waveform I, corresponding to the same waveform shown in FIG. 2. The displacement signal at the output of amplifier 186 is illustrated in FIG. 8 as waveform M. In order to establish the proper phase relationship between the signals I and M, the member 10, for example, is rotated at a very low speed where it is known that the speed is below the critical or resonant speed. At this time, the phase lag angle should approach zero and, accordingly, the phase adjust circuit 194 is regulated by the operator by means of a manually adjustable rheostat 210 (FIG. 1) until the two signals I and M are almost in phase.

As the speed of the member 10 is increased, the waveform M will begin to lag waveform I, the particular phase lag shown in FIG. 8 being identified as $\phi$ and comprising 90°. After passing through the square-wave generator 194, waveform I appears as waveform N in FIG. 8. Similarly, the waveform M, after passing through square-wave generator 202, appears as waveform O. Upon differentiation, the waveform N is converted into waveform P wherein positive spiked pulses 212 appear at the leading edge of each square-wave pulse in waveform N. Similarly, differentiation of waveform O in differentiator 204 produces waveform Q wherein positive spiked pulses 214 are produced by the leading edge of each square-wave pulse in waveform O.

When a positive spiked pulse in waveform P, for example, is applied to the dual trigger flip-flop 198, it will switch from one stable state to the other, thereby raising the output voltage from circuit 198. However, when the next pulse 214 in waveform Q is received by flip-flop 198, it will switch back to its other stable state, whereupon the output voltage of circuit 198 falls back to its original value, thereby producing the square-wave pulses 216 in waveform R. Waveform R is applied to the integrator 206 which, in turn, produces an output direct current voltage proportional to the area encompassed by the pulses 216. As the phase lag angle between waveforms I and M increases, the width of the pulses 216 in waveform R will also increase as indicated by the dotted outline of waveform R in FIG. 8. Hence, the direct current voltage applied to the integrator 208 will also increase. Similarly, as the phase lag angle decreases, the widths of the pulses 216 and the magnitude of the direct current voltage on lead 208 will also decrease.

Thus, the direct current voltage on lead 208 as applied to the servomotor control circuit 182 is proportional to the phase lag angle of the vibrational signal sensed by transducer 16. This voltage, when applied to circuit 182, will cause the servomotor 150 to move pen 142 upwardly as the phase lag angle increases, and downwardly as the phase lag angle decreases.

Again, let us assume that the speed of member 10 is increased from a low value to a high value. As the speed is increased, the phase lag angle will remain constant for a period of time until the critical or resonant speed of the member 10 is reached. At this point, the phase lag angle will increase abruptly, thereby causing the motor 150 to move the pen 142 upwardly as shown in FIG. 1. After the critical or resonant speed is increased, the phase lag angle will again become more or less constant, but displaced 180° with respect to the lag angle at lower speeds. Hence, as the speed of the member 10 is increased and the carriage 140 moves across the table 136, the characteristic "S" curve shown in FIG. 7A will be produced.

It can be seen, therefore, that the present invention provides a means for automatically plotting phase lag angle and vibration amplitude versus speed. Due to the ease of the manner in which the plots can be produced, a record of the reasonant speed characteristics of any rotating body can be placed on file such that an operator of a particular piece of equipment, for example, can look at the plot and be apprised of those speeds at which the equipment should not be operated.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In electronic vibration analyzing apparatus for automatically plotting the phase lag angle of a vibration displacement signal versus the speed of a rotating body, the combination of an electromagnetic transducer operatively connected to the rotating body for producing an alternating current displacement signal having an amplitude and phase dependent upon the amount and location of unbalance in the rotating body, means for producing at least one sine wave signal having a frequency corresponding to the speed of the rotating body, means responsive to said displacement and sine wave signals for producing a signal which at all times varies as a function of the phase angle between said displacement and sine wave signals, means for producing a direct current voltage which varies as a function of the speed of the rotating body, and means including a pen device movable in two directions which are at right angles to each ohter and responsive to said signal which varies as a function of phase and the direct current voltage for scribing a curve on a graph in which one axis represents speed and the other axis represents phase lag angle.

2. The combination of claim 1 wherein the means for scribing a curve on a graph includes a carriage movable along one axis of the graph, the pen being mounted on said carriage for movement at right angles to the direction of movement of the carriage, and servomotor means connected to the carriage and the pen for effecting movement thereof.

3. The combination of claim 1 wherein the means for scribing a curve on said graph comprises a carriage movable along one axis of the graph, the pen being mounted on the carriage for movement at right angles to the direction of movement of the carriage, a first servomotor connected to said carriage and operable in response to said direct current voltage, a second servomotor connected to said pen, means responsive to said sine wave signal and the displacement signal for producing said signal which varies as a function of phase, and means for applying said signal which varies as a function of phase to the second servomotor.

4. The combination of claim 3 wherein the signal which varies as a function of phase comprises a second direct current voltage and the means for producing said second direct current voltage comprises means responsive to said sine wave signal for producing a first square-wave signal, means responsive to said displacement signal for producing a second square-wave signal, a first differentiator for differentiating the first square-wave signal, a second differentiator for differentiating the second square-wave signal, a dual trigger flip-flop circuit responsive to the outputs of said first and second differentiators for producing a third square-wave signal in which the widths of the pulses vary as a function of the phase difference between said displacement and sine wave signals, and means for integrating said third square-wave signal to derive said second direct current voltage.

5. The combination of claim 4 including phase adjustment means for adjusting the phase of said sine wave signal as applied to said means for generating a first square-wave signal.

6. The combination of claim 4 wherein the servomotors are of the two-phase alternating current type, and including chopper means for converting said first and second direct current voltages into proportional alternating current voltages.

7. In electronic vibration analyzing apparatus for automatically plotting the amplitude of a vibration displacement signal versus the speed of a rotating body, the combination of an electromagnetic transducer operatively connected to the rotating body for producing an alternating current displacement signal having an amplitude and phase dependent upon the amount and location of unbalance in the rotating body, synchronous filter means responsive to said displacement signal and having a pass band which varies as a function of the speed of said rotating body, means for producing a direct current voltage which varies as a function of the speed of the rotating body, and means including a pen device movable in two directions which are at right angles to each other and responsive to the output of said filter means and the direct current voltage for scribing a curve on a graph in which one axis represents speed and the other axis represents vibration amplitude.

8. The combination of claim 7 wherein the means for scribing a curve on a graph includes a carriage movable along one axis of the graph, the pen being mounted on said carriage for movement at right angles to the direction of movement of the carriage, a first servomotor connected to the carriage for effecting movement thereof, a second servomotor connected to the pen for moving it along said carriage, means for controlling said first servomotor in response to said first direct current voltage, means for rectifying said alternating current displacement signal, and means for controlling said second servomotor in response to the output of said rectifying means.

9. In electronic vibration analyzing apparatus for automatically plotting the phase lag angle of a vibration signal versus the speed of a rotating body while simultaneously automatically plotting the amplitude of a vibration displacement signal versus the speed of said rotating body, the combination of an electromagnetic transducer operatively connected to the rotating body for producing an alternating current displacement signal having an amplitude and phase dependent upon the amount and location of unbalance in the rotating body, means for producing at least one sine wave signal having a frequency corresponding to the speed of the rotating body, means for producing a first direct current voltage which varies as a function of the speed of the rotating body, graph paper mounted on table means, a carriage movable along one axis of the graph paper on the table means, a first pen mounted on said carriage for movement at right angles to the direction of movement of the carriage, a second pen mounted on the carriage for movement at right angles to the direction of movement of the carriage, first servomotor means responsive to said first direct current voltage for controlling the position of said carriage relative to the graph paper, second servomotor means responsive to said displacement signal for controlling the position of said first pen along said carriage, and third servomotor means responsive to both said displacement signal and said sine wave signal for controlling the position of said second pen along said carriage.

10. The combination of claim 9 wherein said displacement signal is rectified and applied to said second servomotor means, and wherein the third servomotor means is controlled by a direct current voltage which varies in magnitude as a function of the difference in phase between said displacement signal and said sine wave signal.

11. An electronic vibration analyzing apparatus for automatically plotting the relationship between (a) the phase lag angle of a vibration displacement signal and (b) the speed of a rotating body generating the said displacement signal comprising:

means for generating an electrical signal (I) which varies as a function of the speed of the said rotating body;

means for generating an electric signal (II) which continually varies as a function of the instantaneous lag angle of the said displacement signal;

chart means, pen means continuously engaged with said chart means in marking relationship;

two separate control means for moving the point of engagement of said pen means relative to said chart means, one of said control means being responsive to the said speed signal (I) and the other of said control means being responsive to the said lag angle signal (II).

References Cited
UNITED STATES PATENTS

| | | | |
|---|---|---|---|
| 3,052,884 | 9/1962 | Moseley et al. | 346—29 |
| 3,107,538 | 10/1963 | Hack | 73—463 |
| 2,783,648 | 3/1957 | Stovall et al. | 73—462 |
| 2,796,600 | 6/1957 | Church | 73—462 XR |
| 3,048,041 | 8/1962 | Trimble | 73—462 |
| 3,213,689 | 10/1965 | Cain et al. | 73—462 |
| 3,228,251 | 1/1966 | Trimble | 73—462 |
| 3,331,252 | 7/1967 | Thomas et al. | 73—462 |

FOREIGN PATENTS

| | | |
|---|---|---|
| 729,901 | 5/1955 | Great Britain. |
| 1,170,160 | 5/1964 | Germany. |
| 392,105 | 9/1965 | Switzerland. |

JAMES J. GILL, Primary Examiner